United States Patent

Mrose et al.

[11] Patent Number: 6,066,713
[45] Date of Patent: May 23, 2000

[54] PROCESS FOR IMPROVING THE DRAWING ABILITY OF POLYESTER

[75] Inventors: Werner Mrose, Maintal; Ulrich Thiele, Bruchkoebel, both of Germany

[73] Assignee: Lurgi Zimmer Aktiengesellschaft, Frankfurt am Main, Germany

[21] Appl. No.: 08/801,514

[22] Filed: Feb. 18, 1997

Related U.S. Application Data

[63] Continuation of application No. 08/575,981, Dec. 21, 1995, abandoned.

[51] Int. Cl.$^7$ .................................................. C08G 63/02
[52] U.S. Cl. .................. 528/272; 528/308.2; 528/308.4; 528/483; 528/491; 528/492; 528/499; 528/503
[58] Field of Search .......................... 528/272, 308.2, 528/308.4, 483, 491, 492, 499, 503

[56] References Cited

U.S. PATENT DOCUMENTS

| | | | |
|---|---|---|---|
| 4,064,112 | 12/1977 | Rothe et al. | 528/272 |
| 4,263,425 | 4/1981 | Rothe et al. | 528/309 |
| 4,360,661 | 11/1982 | Horlbeck et al. | 528/272 |
| 4,591,629 | 5/1986 | El-Ghatta et al. | 528/308.2 |
| 5,241,046 | 8/1993 | Shiraki et al. | 528/502 |
| 5,262,513 | 11/1993 | Tanaka et al. | 528/272 |
| 5,292,865 | 3/1994 | Kerpes et al. | 528/492 |
| 5,362,844 | 11/1994 | Kerpes et al. | 528/308.9 |
| 5,393,863 | 2/1995 | Yau et al. | 528/308.4 |
| 5,393,871 | 2/1995 | Yau et al. | 528/308.4 |

*Primary Examiner*—Terressa Mosley-Boykin
*Attorney, Agent, or Firm*—McDonnell Boehnen Hulbert & Berghoff

[57] ABSTRACT

A process for the improvement of the drawing ability of polyester, pellets of which are thermally post-treated in the solid phase in an inert atmosphere, containing a precise concentration of water vapor. The water vapor concentration is equal to the amount of water, plus 15%/minus 50%, which could theoretically be formed, at the polyester end viscosity, from the —COOH end groups and the excess —OH end groups of the polyester. An equimolar quantity of the vapor of the alkanediol, which serves as the diol reactant for the polyester, may be substituted for all or part of the water vapor.

6 Claims, No Drawings

PROCESS FOR IMPROVING THE DRAWING ABILITY OF POLYESTER

This application is a continuation of application Ser. No. 08/575,981, filed on Dec. 21, 1995, now abandoned.

The invention relates to a process for improving the drawing ability of polyesters by means of a thermal post-treatment in the solid phase in an atmosphere with regulated water vapor and/or alkanediol vapor concentration.

BACKGROUND OF THE INVENTION

In order to attain high strength, polyester fibers and polyester films are subjected to as high a drawing as possible. The drawing ability of the polyester is significantly improved through a narrow molecular weight distribution and a low concentration of low-molecular weight molecules, such as water, ethylene glycol and oligomers. The effect of the low-molecular compounds is based both on their reactivity, for example, hydrolysis through water, as well as on their function as plasticizers.

Polyesters, subsequently to their production by means of melt phase polycondensation, are either processed directly or first pelletized. Then, depending on the use, before processing, the pellets are crystallized and, in the solid phase at temperatures of above 100° C., subjected to a post-condensation and/or dealdehydization and/or drying. The diffusion and the reaction ability of the low molecular compounds and split-off products is critical for this thermal post-treatment. As a result of the core-to-shell structure of the pellet grains, this effect differs from the center to the surface of the pellet to a pronounced degree. The post-treatment, consequently, leads to a broadening of the distribution of molecular weights, which is undesirable for fibers and films. This effect is particularly intense in the solid phase condensation of polyethylene terephthalate to a final intrinsic viscosity of approximately 0.90 to 1.05 dl/g for spinning into tire cord.

THE PRIOR ART

It is known from the technical literature that the post-formation of oligomers can be reduced during the processing by contacting polyethylene terephthalate pellets after solid phase condensation with at least 500 ppm of water or water vapor per kg of polyester at approximately 50–110° C. (U.S. Pat. No. 5,241,046). In certain copolyesters, the reduction can be accomplished through the adjustment of the moisture content of the polyester from 0.1 to 1.0 weight % before solid phase condensation (U.S. Pat. No. 5,262,513). A reduction of the content of volatile compounds, such as acetaldehyde, should, furthermore, be attainable through treatment of the polyester prior to solid phase condensation/drying with water vapor at 100 to 245° C. (U.S. Pat. No. 4,591,629). It is also known to treat the polyester prior to solid phase condensation with inert gas containing 0.3 to 3.5 weight % of alkanediol, based on the polyester, at approximately 170 to 220° C., by means of which an improved polycondensation rate should be attained (U.S. Pat. No. 4,360,661). The presence of more than 250 ppm of water or of more than approximately 10 ppm ethylene glycol in the inert process gas during the solid phase polycondensation, on the other hand, leads to a lower final viscosity of the polyethylene terephthalate (U.S. Pat. No. 4,064,112). By contacting pellets of polyester (U.S. Pat. No. 5,393,871) or of branched polyester (U.S. Pat. No. 5,393,863) with 300 to 7000 vpm of water vapor, or vapor of an organic hydroxyl compound, during crystallization or during or after solid phase polycondensation, the number of the gels in the polymer can be reduced, but the residence time necessary for attaining a specific viscosity is increased to a quite significant degree.

None of these references teach or suggest how the distribution of molecular weight between the shell and the core of the polyester pellets can be controlled, or how the drawing ability of polyester can be improved during a thermal solid phase treatment.

THE INVENTION

The object of the present invention is to provide a process which makes possible an improvement in the drawing ability of polyesters, particularly polyethylene terephthalate, which are subjected to a thermal post-treatment, such as solid phase polycondensation, dealdehydization and/or drying, by minimizing the differences in molecular weight between the shell and core polymer of the individual pellet grains.

This process is characterized in that, at least during one part of the thermal post-treatment of the polyester pellets in inert atmosphere, the inert gas contains, in vapor form, either water or an equimolar quantity of the alkanediol serving as the alcohol reactant for the polyester. The water vapor concentration is equal to a theoretical water concentration plus 15%/minus 50%, which theoretically could be formed at the final polyester viscosity from the —COOH end groups and the excess —OH end groups of the polyester.

It has been found, surprisingly, that the distribution of molecular weight of the polyester pellets during a thermal post-treatment in inert atmosphere can be influenced, in a simple manner, by the composition of this inert atmosphere.

Polyesters to be treated in accordance with this invention are polymers of at least one aryl- or one cycloalkyl dicarboxylic acid, such as terephthalic acid, isophthalic acid, naphthalene dicarboxylic acid, biphenyl dicarboxylic acid or cyclohexane dicarboxylic acid, and at least one alkanediol or cycloalkanediol, such as ethylene glycol, propanediol, butanediol, hexanediol or cyclohexane dimethanol. Polyethylene terephthalate and its low-modified copolymers, with an intrinsic viscosity after the treatment in the range of 0.55 to 1.20 dl/g, are preferred.

The thermal treatment of the polyester is accompanied by a polycondensation and the splitting off of low-molecular products, which are gaseous at treatment temperature, such as water and—in the case of polyethylene terephthalate—ethylene glycol and acetaldehyde. The polycondensation speed and the splitting-off speed are determined by the temperature, the concentration of the reactive groups, the speed of the chemisorption and diffusion, including the average way-length of diffusion, and the reverse reactions, such as hydrolysis and alcoholysis, through the split-off products. In the known processes, because of the concentration gradient of low-molecular split-off products between the inert atmosphere and the core of the individual pellet grains, the chemisorption and the diffusion, as well as the reverse reactions in the shell area of the pellet grains, are significantly more distinct than in the core area. The molecular weight of the polyester, which is treated in known manner, correspondingly increases from the core to the shell of the individual pellet grains. For example, a polyester having an average intrinsic viscosity of 1.010 dl/g will have a viscosity of 0.881 dl/g in the core, and up to 1.218 dl/g at the surface of the pellets.

It is therefore desirable to minimize the concentration gradients between the inert atmosphere and the polyester pellets without negatively influencing the desirable polycondensation, dealdehydization and/or drying of the polyester. The difficulties resulting lie in the quantities of low-molecular separation products which are different from case to case, and in the previously-mentioned negative effect of more than approximately 250 ppm of water or 10 ppm of ethylene glycol in the inert gas (U.S. Pat. No. 4,064,112).

It has been found, surprisingly, that, without the appearance of undesirable side-effects, the difference between the molecular weights of the core and the shell of the pellets grains tends to zero if the inert atmosphere contains water vapor in a concentration which is approximately equal to the water concentration which can theoretically be formed at the polyester final viscosity from the —COOH end groups and the excess —OH end groups of the polyester. More precisely, the water vapor concentration in the inert atmosphere must be equal to the theoretical water concentration plus 15% / minus 50%, preferably plus 0%/minus 35%. Instead of the water or a portion of the water, the inert atmosphere can, without any disadvantage, also contain the quantity, equimolar to the water, of the alkanediol which is serving as the basis for the polyester. In the case of polyethylene terephthalate, this is ethylene glycol. The water and/or the alkanediol can be added to the inert atmosphere or consist, in whole or in part, of the split-off products which are contained in the process gas of a preceding thermal treatment of polyester; only the quantity is significant.

The theoretical water concentration is computed from the —COOH end group concentration of the polyester after the thermal treatment, in meq/kg, multiplied by the molecular weight of water. In polyesters without special modifications of the end groups, the —COOH end group concentration is dependent on the intrinsic viscosity of the polyester and, to a certain extent, on the production process, whereby the —OH end group concentration is higher by a multiple of the —COOH end group concentration. Typical values for polyethylene terephthalate (PET) which is produced in accordance with standard processes are presented in Table 1. In addition, the table contains the water concentration, and the corresponding dew point of the process gas, which is computed from the water concentration.

| Thermally-treated PET | | | | |
|---|---|---|---|---|
| | | Theor. water | Process gas | |
| I.V. [dl/g] | COOH [meq/kg] | conc. [weight-ppm] | Water conc. [weight-ppm] | Dew point [° C.] |
| 0.53 | 30 | 540 | 270–621 | (−28.9)–(−20.7) |
| 0.64 | 25 | 450 | 225–518 | (−30.7)–(−22.3) |
| 0.70 | 22 | 396 | 198–455 | (−31.9)–(−23.7) |
| 0.86 | 16 | 288 | 144–331 | (−35.0)–(−26.9) |
| 1.00 | 12 | 216 | 108–248 | (−37.5)–(−29.7) |
| 1.10 | 10 | 180 | 90–207 | (−38.2)–(−31.4) |
| 1.20 | 8 | 144 | 72–166 | (−40.9)–(−33.7) |

The actual —COOH end group concentration of the polyester after the thermal treatment is determined, in a preliminary experiment, with an atmosphere, the dew point of which corresponds to the final intrinsic viscosity (I.V.) which is desired, and otherwise under the same conditions as the actual thermal post-treatment of the polyester. During the preliminary test, other experimental values can also be applied, rather than the values which are listed in Table 1, especially with other polyesters and/or special production processes.

The treatment with an atmosphere containing water or alkanediol must be continued at least until the difference in the intrinsic viscosities between the shell and core polymer amounts to less than 20%, preferably less than 10%, in relation to the average intrinsic viscosity of the polymer. Depending on the polyester, at least 0.5 to 5 hours are necessary for this. The maximum treatment length is not critical, and is suitably equal to the length of the thermal post-treatment.

The thermal post-treatment, in which the process in accordance with the invention is used, is a solid phase polycondensation, a dealdehydization, a drying and/or a thermal conditioning. In multi-stage processes, the invention can be applied in all stages, or limited to one of the process stages. Thus, for example, the solid phase polycondensation can be carried out in an inert atmosphere with a water concentration corresponding to the —COOH end groups, while the subsequent drying which is necessary for the further processing takes place in the conventional manner with dried inert gas. Remarkably, it is even possible to bring about a broad molecular weight distribution obtained by means of conventional solid phase polycondensation into a narrow distribution of molecular weight through a subsequent drying or thermal conditioning of the polyester in accordance with the invention. The balancing out of the molecular weights between the core and the shell polymer is probably predominantly based, in this case, on the hydrolytic degradation of the higher-molecular shell polymers. Preferred areas of application are the solid phase condensation of polyethylene terephthalate for tire cord material and the dealdehydization of polyethylene terephthalate for high-strength food packaging foils.

With the exception of the quantity of water or of alkanediol which is to be dosed in accordance with the invention, the carrying out of the thermal post-treatment takes place in the known manner, for example, as stated in the U.S. Pat. Nos. 4,064,112; 4,263,425; 5,292,865; or 5,362,844. Nitrogen, carbon dioxide, air, or mixtures thereof are used as inert atmosphere, whereby the treatment is carried out under a slight overpressure, normal pressure, or vacuum, generally at an absolute pressure in the range of 10 mbar to approximately 1.5 bar.

The polyester characteristic values stated here were determined as follows:

Average intrinsic viscosity (I.V.)

125 mg of polyester are dissolved into 25 ml of a mixture of phenol and 1,2-dichlorobenzol (3:2), and the viscosity of this solution is determined, at 25° C., in accordance with the Ubbelohde method. The intrinsic viscosity, in accordance with Billmeyer, is computed from the relative viscosity which is thus obtained.

Difference of the I.V. between shell and core polymer

Approximately 50 g of polyester pellets are added into a cylindrical container (diameter 60 mm) with an axial frictional cylinder (diameter 20 mm, 100 RPM), and the pellet grains are abraded, layer after layer, at 20° C. At regular intervals of time, the material abraded is separated, weighed, and its intrinsic viscosity is determined. The intrinsic viscosities are graphically presented as a function of the specific residual weight of the pellets, and the intrinsic viscosity for 0% and 100% abrasion is determined from the curve. The difference between the two values is stated. The method works in a reproducible manner, if the polyester is present in a crystalline form.

—COOH end groups

The polyester is, during heating, dissolved in a mixture of o-cresol and chloroform (70:30 weight parts) and the content of COOH groups is photometrically determined with 0.05 n-ethanolic potassium hydroxide against bromothymol blue.

Double refraction of the fibers ($\Delta\eta$)

The determination is carried out by means of a polarization microscope with a tilt compensator and green filter (540 nm) with the use of wedge sections. The phase difference between the ordinary and the extraordinary beam upon the passage of linear polarized light through the filaments is measured. The double refraction is the quotient of the phase difference and the diameter of the filament.

Strength of the fibers

The determination is carried out on cord fibers, to which a torsion of 50 T/m was applied, on a test length of 250 mm, with a drawing-off speed of 200 mm/min.

EXAMPLE 1 (Comparative example)

Polyethylene terephthalate (PET) pellets having the following characteristics:

| | |
|---|---|
| Intrinsic viscosity: | 0.611 dl/g |
| Diethylene glycol content: | 0.91 weight % |
| COOH end groups: | 33 meq/kg |
| Antimony content: | 215 ppm |
| Density: | 1.3385 g/cm$^3$ |
| Pellets weight: | 3.106 g per 100 grains; | were crystallized, under nitrogen, in a fluidized bed crystallizing unit at a gas temperature of 180° C. and a resulting pellet temperature of 175° C. over a period of time of 20 minutes. The post-crystallization was subsequently carried out, in a mechanically-agitated crystallizing unit, at an oil temperature of the device of 235° C., and a resulting pellet temperature at the exit of the crystallizing unit of 232° C. with an average residence time of 60 minutes.

The pellets exiting from the crystallizing unit were subsequently polycondensed at a pellet temperature of 220° C., a gas/PET ratio of 1:1, under nitrogen with a dew point of −85° C. (corresponding to 0.2 ppm of H$_2$O), over a period of 12 hours. There was obtained a polyester which had an average I.V. of 1.020 dl/g, whereby the difference of the I.V. between the shell and the core amounted to 0.340 dl/g and the —COOH end group concentration amounted to 18 meq/kg.

During the spinning of this polyester into tire cord, it was observed that at a spinning speed of 500 m/min., the spinning filaments had a double refraction $\Delta\eta$ of 6•10$^{-2}$ and the drawing ability was limited to a drawing ratio of 1:5.4, which corresponds to a strength of 76 cN/tex.

EXAMPLE 2

The same polyethylene terephthalate pellets as in Example 1 were pre- and post-crystallized by means of the method which is described in Example 1. Subsequently, the pellets were polycondensed up to an intrinsic viscosity of approximately 1.00 dl/g. A final viscosity of 1.00 dl/g corresponds, in accordance with Table 1, to a polyester with 12 meq/kg of —COOH end groups, from which a theoretical water concentration of 216 weight-ppm is computed.

The polycondensation of the pellets took place in the same manner as in Example 1, but the dew point of the nitrogen in the preliminary test, was set at −35° C., corresponding to 144 weight-ppm of water, or the theoretical water concentration minus 33.3%. After a polycondensation period of 15 hours, there resulted PET pellets with an average I.V. of 0.950 dl/g and 11.8 meq/kg —COOH end groups. This corresponds to a theoretical water concentration of 212.4 weight-ppm. The polycondensation was thus continued, in the same manner as in the preliminary test with nitrogen, with a dew point of −35° C. The difference of the intrinsic viscosities between the shell and the core polymer of the PET pellets which had thus been post-condensed amounted to 0.075 dl/g. This is 22% of the I.V. difference which was obtained during the comparative test.

The polyester pellets were subsequently spun into tire cord under the same conditions as in Example 1. A drawing ratio of 1:6.2 was achieved. The double refraction $\Delta\eta$ in the spinning filaments amounted to 2.5•10$^{-2}$, and a strength of 82.3 cN/tex was thereby attained during a good run of the spinning mill.

EXAMPLE 3

A portion of the polyethylene terephthalate pellets which were obtained in Example 1, with an I.V. of 1.020 dl/g, an I.V. difference of 0.340 dl/g, and a —COOH end group concentration of 18 meq/kg, was, subsequently to the solid phase condensation which is described in Example 1, conditioned by storing them over the additional period of 2 hours at 225° C. in nitrogen, with a dew point of −31 ° C. The conditioned polyester pellets had an I.V. of 0.970 dl/g, an I.V. difference of only 0.062 dl/g, and a —COOH end group concentration of 20 meq/kg. It can, at the drawing ratio of 1:5.82, be spun just as well as that of Example 2.

We claim:

1. A process for improving the drawing ability of polyester which is the reaction product of a dicarboxylic acid and an alkanediol, which process comprises preparing an inert gas comprising a hydroxy compound selected from the group consisting of water, said alkanediol, and mixtures thereof, and thermally post-treating pellets of the polyester with the inert gas containing said hydroxy compound, said preparing comprising a) selecting the concentration of hydroxy compound in the gas by determining the —COOH end group concentration, m, in meq/kg of the polyester after said thermal post-treating, b) using the —COOH end group concentration to select an amount of gaseous hydroxy compound for addition to the gas such that the molar amount of hydroxy compound in the gas is in the range of from (m−50%) to (m+15%), and c) adding that amount of hydroxy compound to the gas.

2. Process of claim 1 in which said post treatment is continued until the difference between the intrinsic viscosity of the shell and the intrinsic viscosity of the core of said polyester pellets is less than 20% of the average intrinsic viscosity of said pellets.

3. Process of claim 1 in which said post treatment is carried out during solid phase condensation, or during a subsequent conditioning step.

4. Process of claim 1 in which said inert gas is N$_2$, CO$_2$, air, or a mixture thereof and is under an absolute pressure of 10 mbar to about 1.5 bar.

5. Process of claim 1 in which said hydroxy compound in vapor form is water vapor.

6. Process of claim 1 in which said polyester is polyethylene terephthalate.

* * * * *